United States Patent Office 3,378,468
Patented Apr. 16, 1968

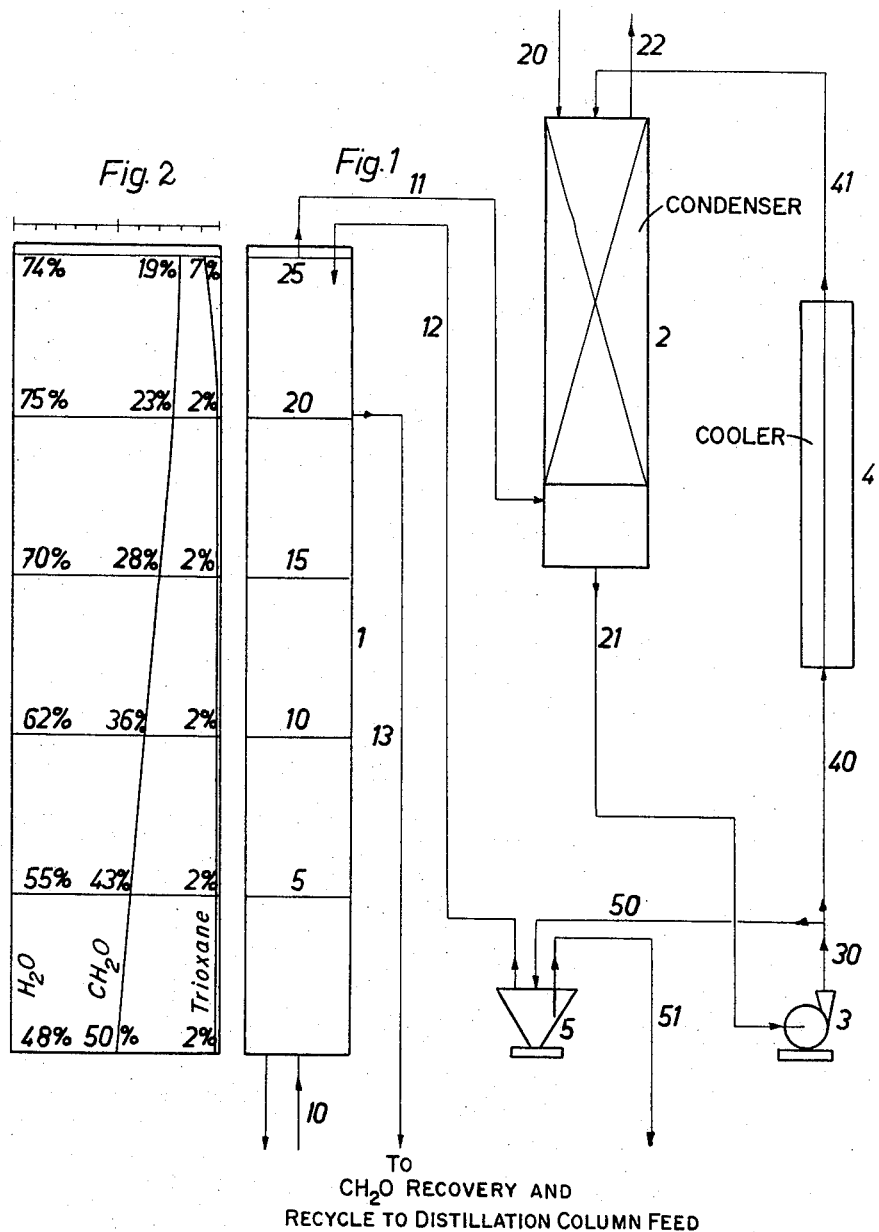

3,378,468
DISTILLATION AND RECOVERY OF TRIOXANE FROM AQUEOUS FORMALDEHYDE - ACIDIC CATALYST SOLUTIONS
Gerhard Langecker, Cologne-Lindenthal, Germany, assignor to Josef Meissner, Kommanditgesellschaft, Cologne-Bayenthal, Germany
Filed Nov. 29, 1965, Ser. No. 510,326
Claims priority, application Germany, Nov. 28, 1964, M 63,295
7 Claims. (Cl. 203—44)

ABSTRACT OF THE DISCLOSURE

A method for the improved production of trioxane from an aqueous formaldehyde solution in the presence of an acidic catalyst followed by continuous distillation of the produced trioxane through a distillation column and the recovery thereof from the distillate by solvent extraction, the novel method including withdrawing two streams which are independent of each other from the distillation column, these being an upper stream withdrawn from the head of the distillation column and a lower stream withdrawn from the distillation column at a point below the head thereof, the upper stream being subjected to a trioxane extraction by means of a solvent and a recycling back to the head of the distillation column, while the lower stream is reconcentrated in formaldehyde and recycled to the feed end of the distillation column.

---

This invention relates to a process for the production of trioxane from an aqueous formaldehyde solution in the presence of an acidic catalyst by continuous distillation of the produced trioxane and its isolation from the distillate by a solvent.

Previously, the process was conducted in such a manner that a distillate was withdrawn from the head of the distillation apparatus, was cooled, and the condensate was recycled into the distillation apparatus; a partial stream was branched off from the condensate, the latter containing trioxane, formaldehyde and water, and was introduced into an extraction device. In the latter device, trioxane was recovered by a solvent; the formaldehyde and the remainder of trioxane were reintroduced, after reconcentration, into the reactor or the sump of the distillation apparatus.

According to the present invention, the process is conducted in such a manner that there are withdrawn from the distillation apparatus two partial streams, namely, one of these streams at the head of the distillation apparatus as a distillate, and the other at a distance therefrom; both partial streams are returned to the distillation apparatus after at least respectively one component has been removed therefrom, namely, the condensed distillate at the head and the lower partial stream to the reactor or sump of the distillation apparatus.

If these two processes are compared with each other, it can clearly be seen that the separation of the quantities of medium to be withdrawn from the distillation apparatus into partial streams which are independent from each other, in accordance with the invention, makes it possible to remove not only the amount of the product to be obtained and to be isolated, namely, the trioxane, from the distillation cycle, but also the interfering or otherwise collecting components, namely, water, from the second cycle, the latter components being removed in a quantity which is independent from the amount of the withdrawn product.

While, in the prior art process, only a relatively low proportion of water is contained in the distillate and thus the sump loses its concentration of formaldehyde to a certain extent, it is possible, by the novel process of the invention, to determine the proportion of water to be withdrawn independently of the quantity of the product to be obtained: preferably, the outlet of the second partial stream is placed at a position of the distillation apparatus at which the proportion of water is larger than in the head product. According to a further feature of the invention, the second partial stream is withdrawn at a point where not only the proportion of water is high, but also the proportion of the other components is as small as possible.

Thus, by means of the invention, it is not only possible to avoid the depletion of the sump in formaldehyde, but also to even keep it at such a concentration of formaldehyde that it is not necessary to charge a particularly highly concentrated formaldehyde solution.

Above and beyond this already decisive advantage, the invention, however, makes additionally possible a particularly simple, cheap and effective separation of the trioxane from the distillate or condensate, since it permits solely trioxane to be withdrawn from the distillate cycle. Moreover, no attempt need be made to withdraw the trioxane as completely as possible, but it is sufficient—without becoming uneconomical—to recover just so much of the trioxane as is possible in the simplest manner. This is accomplished, according to the invention, in a one-stage extraction step, or, if desired, a simple washing step by the addition of a solvent, separation of the phases, and the return of the aqueous layer to the column in the form of reflux.

In contradistinction thereto, in the known process, as much trioxane as possible must be withdrawn in order to be economical to a certain extent, for the remainder of the extracted partial stream still contains so much formaldehyde that the former must be concentrated and returned to the reactor or sump since a discharge is not possible because the danger of polluting the sewage system is too great.

Nevertheless, surprisingly and unexpectedly, in accordance with the novel process of the invention, there is obtained a larger yield of trioxane than in the known process.

Moreover, the invention presents the further advantage that the solvent which is still dissolved in the extract to a minor degree can not enter the reactor, as it does in the known process, but only goes to the head of the column wherefrom it enters directly the distillation cycle again.

Although the trioxane, on account of the particular conditions created by the invention, can actually be separated in a simple manner from the distillate, and thus no particular measures are basically required therefor, the present invention also provide for this step, according to a further feature thereof; these provisions are particularly suitable for the two-cycle process of the invention, but also yield advantages in connection with other processes.

This is accomplished by condensing and simultaneously extracting the distillate or condensate in its cycle by means of a cooled solvent suitable for trioxane; separating from this condensate the solvent with the trioxane contained therein; and recycling the aqueous condensate with the remainder of the trioxane to the head of the distillation apparatus in the form of reflux.

In this manner, on the one hand, only trioxane is removed and, on the other hand, the condensation and extraction steps are conducted in a single apparatus.

Furthermore, the utilization of a conventional condenser offers the further possibility of carrying out, in addition to the direct condensation and extraction, a gas washing or scrubbing step which removes the residues of the non-absorbed formaldehyde and thus positively prevents a clogging of the cooling system as well as of any vacuum line which might be provided. Finally, the inclusion of such a co-condenser or mixed condenser into a distillation process of the above-mentioned type makes it possible to employ lower entrance temperatures for the cooling mixture into the condenser system, so that the partial pressure of the components can be lowered. Thereby, particularly in case of a vacuum distillation process, a larger loss in substance is substantially prevented.

These features and further features of the invention can be seen from the following example described in connection with the accompanying schematic drawing. The illustrative example presented is a vacuum distillation because the combination of the present invention with such a distillation is particularly advantageous, since at the head of the distillation apparatus the proportion of formaldehyde is smaller than in the case of distillation apparatuses operating under normal pressure. However, it will be understood that the invention is not to be regarded as limited to vacuum conditions.

Furthermore, a co-condenser or mixed condenser is employed in the described embodiment. In the illustrative example, the dichlorobenzenes are mentioned as especially advantageous solvents, these dichlorobenzenes being advantageously usable in the vacuum process individually or in mixtures with one another.

Additional objects and advantages of the present invention will become apparent upon consideration of the following description when taken in conjunction with the accompanying drawings in which:

FIGURE 1 shows a schematic arrangement of a distillation and recovery system for the production of trioxane.

FIGURE 2 is a set of graphs showing the relationship between the water content and trioxane content in the distillation column of the apparatus of FIGURE 1.

Referring to FIGURE 1 of the drawing, 1 denotes a distillation column maintained under vacuum and having twenty-five plates. In front of the column, a reactor is connected (which is not shown) wherein trioxane is formed from aqueous formaldehyde and an acidic catalyst, such as, for example, sulfuric acid. The water content increases from plate to plate from about 48% to about 74%; the content of formaldehyde decreases from about 50% to about 19%, whereas the content of trioxane remains constant at 2% up to shortly before the head and only increases to about 7% on the last plates—thereby lowering the water content, particularly. These relationships are illustrated graphically in the side FIGURE 2, in connection with a practical example. Reference numeral 22 denotes a vacuum connection.

Referring to FIGURE 1, condenser 2 is connected to the head of the column 1 of this distillation apparatus; both devices are connected via conduit 11 wherein the vapor mixture of water, trioxane and formaldehyde is conducted to the condenser. Although a normal condenser could be employed and an extraction device could be connected thereafter, there is employed, in the illustrated embodiment of FIGURE 1, of the invention as a particularly advantageous device, a co-condenser (mixed condenser) charged with filling bodies (filler), particularly, wherein the condensation, extraction and washing steps take place simultaneously in one working step. Into this co-condenser, there is introduced, via conduit 20, a solvent for the trioxane, such as, for example, a dichlorobenzene or mixture of several dichlorobenzenes, and preferably o-dichlorobenzene. After the processes have been initiated, the solvent charged with trioxane can be returned to the process at this point after it has been separated from the trioxane.

This solvent, together with part of the distillate or condensate, is reintroduced, via a cooling device 4 in the cycle, again and again into the condenser, circulation therethrough being achieved via the conduit 21, a pump 3, and the conduits 30, 40 and 41.

In front and after the cooling device 4, a partial stream is branched off from this liquid mixture of water and organic solvent and conducted, via the conduit 50, to a separator 5 wherein the organic trioxane solution is separated from the aqueous solution and conducted, via conduit 51, to a working-up device which is not shown. In the last-mentioned device, the separation of the trioxane from the solvent is carried out, whereupon the solvent is recycled into the condenser cycle, for example at 40 or 20.

From the separator 5, the remainder of the mixture of water, trioxane and formadehyde is reintroduced into the head of the distillation apparatus; water and formaldehyde proportions are larger in this return line 12 than in the discharge line 11. The distillate is thus conducted in a cycle via the conduit 11, the condenser 2, the conduit 21, the pump 3 the conduits 30 to 50, the separator 5 and the conduit 12, and only trioxane is withdrawn from the cycle.

From the standpoint of the economy and the ability to function of the process, it is undesirable to remove all or substantially all of the trioxane from the mixture, since the remaining trioxane is fed back to the head of the distillation device, and not to the reactor.

The cooling cycle takes place via condenser 2, conduit 21, pump 3, conduits 30 and 40, cooling device 4, and conduit 41.

An advance of the novel process of the invention is that the expenditure in apparatus represents a minimum unknown heretofore, since a direct condensation, extraction and gas washing step is employed, and only that quantity of trioxane is withdrawn which can be obtained without difficulty in this single, combined operation step. Since it is of no decisive consequence how much formaldehyde or how much water is contained in the distillate, for purposes of this process, inasmuch as both components are recycled in the same proportion to each other as they were distilled off, it is likewise possible to conduct this process not only in case of a vacuum distillation but also in case of a distillation under normal pressure.

As was stated in the introduction, it is of no special importance at which point of the distillation apparatus the second cycle is withdrawn, since this cycle can be regulated, with respect to the quantity to be withdrawn, with regard to the head cycle. However, it is advantageous to provide the outlet of this lower cycle at a place where particularly the trioxane proportion is at a minimum and where the water proportion is a maximum, if possible, whereby also the formaldehyde proportion assumes an advantageous value perforce.

In the illustrative embodiment, the outlet was provided at about the twentieth plate of a twenty-five-plate distillation column, where the proportion of water is very high (75%) and the trioxane proportion (2%) and also the formaldehyde proportion (23%) are so favorable that the restoration of the concentration before recycling into the reactor is relatively simple.

This second cycle consists of the conduit 13, a concentrating device, not shown, for formaldehyde, and the reactor which is likewise not shown wherefrom then the concentrated formaldehyde, inclusive of the small percentage of trioxane still contained in the formaldehyde solution, is fed to the distillation apparatus 1.

Since the content of trioxane of this second cycle is small, the rate of formation of the trioxane in the reactor is not disturbed, although only a portion of the trioxane is withdrawn in the upper cycle.

EXAMPLE

For production of trioxane according to the above process, 100 lts. of formaldehyde 60% by weight have been introduced into a steam-heated reaction vessel with a capacity of 140 lts. The formaldehyde contained 2% by weight of sulphuric acid, and the mixture was heated up to the boiling point. The vapours escaping were conveyed through a steam line provided with a throttle valve to the sump of a bubble cap column with 25 trays, which was arranged 7.5 mts. higher, the overflow from the column sump being recycled to the reaction vessel through a down pipe. A manostat provided for a constant pressure of 1 atm. abs. to be maintained; in the course of the trial, there resulted a boiling temperature of 98 to 100° C., the column and the subsequent apparatuses being subjected to a pressure of 0.3 atm. abs.

The vapours of abt. 66° C. escaping at the head of the distilling column were condensed in a mixing condenser consisting of a tube filled with Raschig rings, the condensate was pumped off at the lower end, cooled down from 58° C. to 35° C. and recycled to the mixing condenser from above. At the same time, o-dichlorobenzene was added to this system in such a quantity that the ratio of the circulating aqueous phase to the organic phase was 1:0.6 up to 1:0.7. Part of this two-phase mixture was withdrawn from the cooling system, the phases were separated, the aqeous phase recycled to the column head as reflux, and the organic phase containing the obtained trioxane was collected.

The water withdrawal from the total system—via a small cooler—was effected from the 15th tray, the fresh formaldehyde solution being conveyed to the reactor.

Corresponding to a reflux of 18.1 lts./h. of aqueous phase with 21% by weight of trioxane and 15.7% by weight of formaldehyde from the separator to the head of the distilling column, 11.7 lts./h. of organic phase with 31% by weight of trioxane have been taken off. The concentration of the solution taken off at the 15th tray with 3.5% by weight of trioxane and 28% by weight of formaldehyde required a withdrawal of 6.3 kg./h. of this solution and an addition of 10.8 kg./h. of formaldehyde 60% by weight to the reactor so that the volume, the concentration of the catalyst and formaldehyde were maintained constant, 4.5 kg. of trioxane being obtained per hour in an organic solution.

If the volume ratio of circulating aqueous and organic phase with constant evaporation output of the reactor is determined to be 1:1, an organic phase with only 16.3% by weight of trioxane would be obtained, whereas the aqueous phase contained 12% by weight of trioxane and 17.6% by weight of formaldehyde. The solution withdrawn from the 15th tray contained then 28% by weight of formaldehyde and 2.9% by weight of trioxane. It had to be withdrawn in a quantity of 4.9 kg./h. and 7.6 kg. of formaldehyde 60% by weight must be added per hour to the sump in order to obtain the reaction conditons. In this, 3.05 kg. of trioxane per hour would be obtained.

It will be understood that the above description of the present invention is susceptible to various modifications, changes, and adaptations, and the same are intended to be comprehended within the meaning and range of equivalents of the appended claims.

What is claimed is:

1. In a method for the production of trioxane from an aqueous formaldehyde solution in presence of an acidic catalyst followed by introduction of the produced trioxane to the bottom of a distillation column and continuous distillation of the produced trioxane through the distillation column and the recovery thereof from the distillate by solvent extraction, the improvement which comprises the steps of withdrawing two streams which are independent of each other from the distillation column, these being an upper stream withdrawn from the head of said distillation column and a lower stream withdrawn from said distillation column at a point below said column head, at which point the mixture in the distillation column has a water content of approximately 75% and a trioxane content of approximately 2%, extracting trioxane from said upper stream by solvent extraction, recycling said upper stream after extraction to the head of the distillation column, reconcentrating said lower stream in formaldehyde, and recycling said reconcentrated lower stream to the feed end of said distillation column.

2. The method of claim 1 in which the lower stream is withdrawn at a point of the distillation column where the proportion of water is as high as possible and the proportion of trioxane is as low as possible.

3. The method of claim 1 in which a balance is maintained between the respective amounts of upper and lower streams withdrawn from the distillation column so that substantially only trioxane is withdrawn by the upper stream and substantially only water is withdrawn by the lower stream.

4. The method of claim 1 in which the upper stream is condensed and extracted in a mixing condenser in its cycle by means of a cooled solvent for trioxane, the trioxane is separated from the solvent, and the remainder of the condensate is recycled to the head of the distillation column.

5. The method of claim 4 in which a portion of said upper stream including a mixture of water, formaldehyde, trioxane, and solvent resulting from said solvent extraction is cooled after adding further solvent, and then recycled to the mixing condenser.

6. The method of claim 5 in which the remaining portion of said upper stream is treated to separate solvent and that part of the trioxane which is extracted, as well as the remainder of the unextracted trioxane, water and formaldehyde is recycled to the head of the distillation column.

7. The method of claim 4 in which the trioxane is separated from the solvent, and the solvent is recycled to the mixing condenser.

References Cited

UNITED STATES PATENTS

| 2,304,080 | 12/1942 | Frank | 260—340 |
| 2,347,447 | 4/1944 | Walker | 260—340 |
| 2,465,489 | 3/1949 | Sokol | 260—340 |
| 3,176,023 | 3/1965 | Yamase | 203—67 |
| 3,197,437 | 7/1965 | Wall | 260—67 |
| 3,281,336 | 10/1966 | Talbert | 203—64 |
| 3,313,713 | 4/1967 | Martin | 203—92 |

OTHER REFERENCES

Chemical and Engineering News, vol. 21, 1943, pp. 1250–1251.

NORMAN YUDKOFF, *Primary Examiner.*

F. E. DRUMMOND, *Assistant Examiner.*